United States Patent [19]
Gold

[11] Patent Number: 5,472,304
[45] Date of Patent: Dec. 5, 1995

[54] SCREW SUPPORT FOR A WALL MOUNT

[76] Inventor: Peter Gold, 389 Peninsula Blvd., Hempstead, N.Y. 11550

[21] Appl. No.: 272,609

[22] Filed: Jul. 11, 1994

[51] Int. Cl.[6] .................................................. F16B 21/00
[52] U.S. Cl. ............................ 411/344; 411/439; 411/999
[58] Field of Search .................................. 411/340, 344, 411/345, 346, 999, 439

[56] References Cited

U.S. PATENT DOCUMENTS

| | | | |
|---|---|---|---|
| 632,540 | 9/1899 | Sampson | 411/340 |
| 1,521,024 | 12/1924 | Hubener | 411/344 |
| 1,521,025 | 12/1924 | Hubener | 411/344 |
| 1,521,026 | 12/1924 | Hubener | 411/344 |
| 4,714,366 | 12/1987 | Boodrot | 411/340 |
| 5,044,854 | 9/1991 | Oh | 411/344 |

*Primary Examiner*—Flemming Saether

[57] ABSTRACT

A planar pointed body, impacted through a sheetrock wall to create a rectangular notch for sighting therethrough a central opening in the planar body incident to a self-threading screw being applied along the line of sight into threaded engagement with said central opening so that the planar body serves as a support for the screw when serving a wall mounting function.

2 Claims, 2 Drawing Sheets

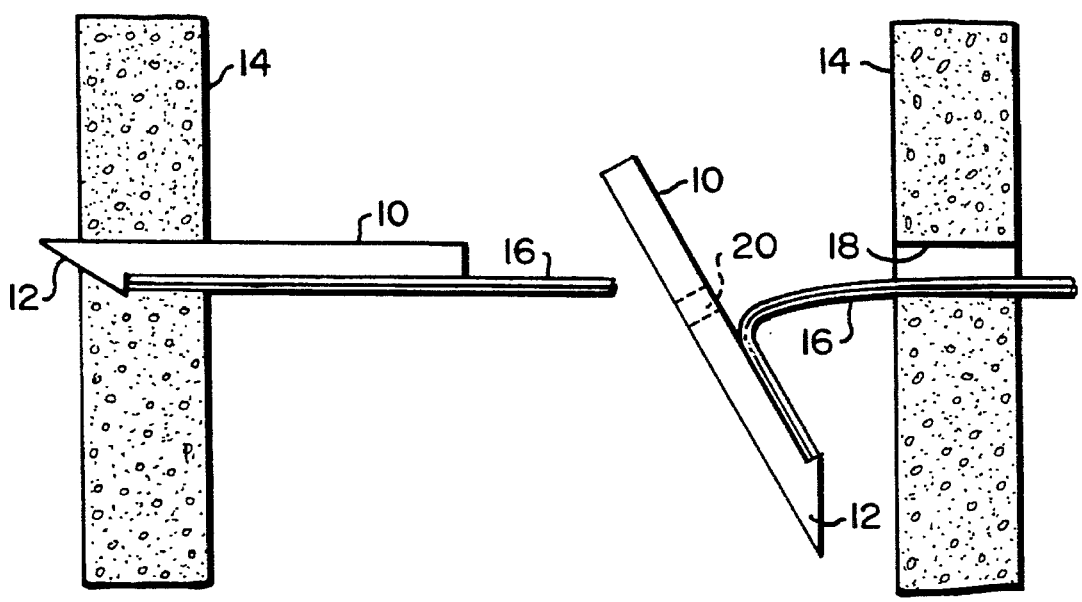
FIG.1
PRIOR ART
FIG.2
PRIOR ART
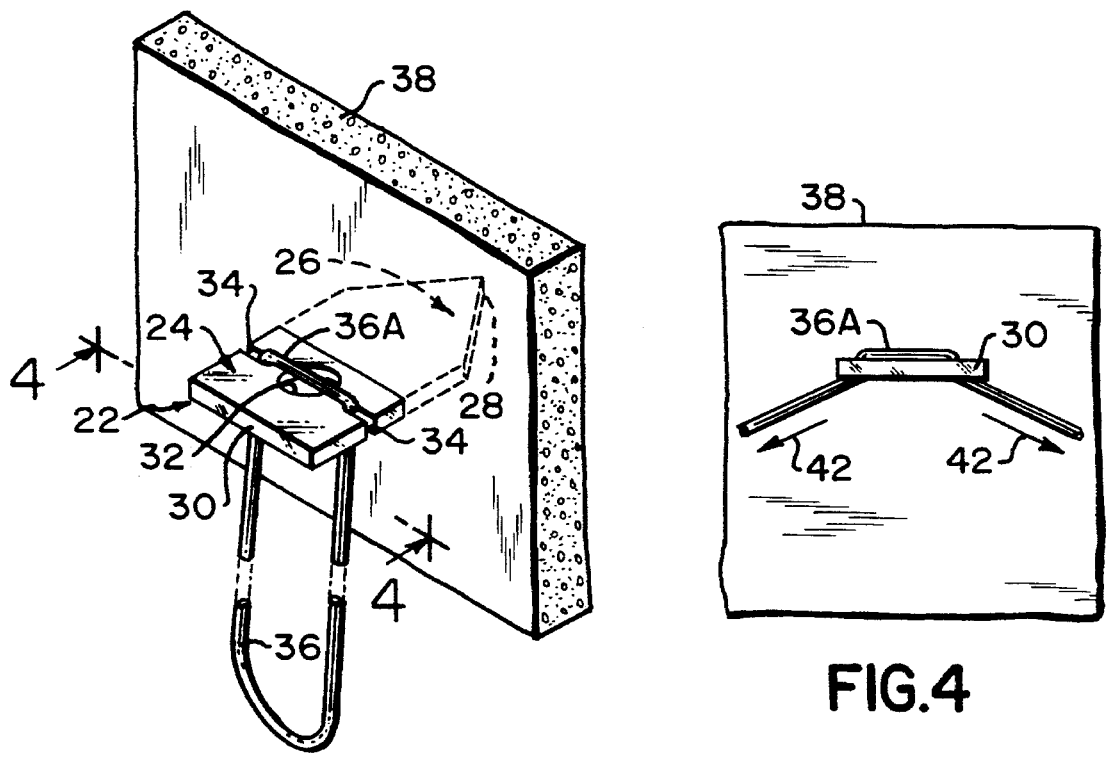
FIG.3
FIG.4

5,472,304

SCREW SUPPORT FOR A WALL MOUNT

The present invention relates generally to a support for a weight-bearing screw installed in a sheetrock or similar construction material wall, without which support, the screw cannot be used for the weight-bearing purposes intended, and more particularly to screw-mounting improvements which obviate a preliminarily applied drilled hole in the wall for the screw, tedious alignment techniques of the screw relative to an anchoring device strategically located behind the wall, and other such shortcomings of the prior art.

EXAMPLES OF THE PRIOR ART

In popular use in preparing a sheetrock wall for the installation of a screw is a special bolt, commonly referred to as a "molly bolt", which is inserted through a preliminarily applied drilled hole in the wall and is caused by the screw cooperating therewith to configurate behind the wall into an anchoring device for the screw.

The need for the drilled hole has been recognized as a short-coming, and has been addressed in numerous patented alternatives, one being illustrated and described in connection with FIGS. 1 and 2 of this application, and other exemplified by U.S. Pat. No. 4,043,245 for "Anchoring Device" issued to Kaplan on Aug. 23, 1977, and U.S. Pat. No. 5,054,981 for "Screw and Toggle Fastening Means" issued to Schnedl on Oct. 8, 1991, both of which use a sharp pointed component to form its own hole in the wall, thereby obviating the need for a drill. With all known drilled hole alternatives, however, after achieving penetration through the wall, there is difficulty in aligning the screw relative to the screw-anchor component located behind the wall having a hole of a diameter sized to be threadably engaged by the screw, and of achieving a facilitated passage of the screw anchor through the wall.

Broadly, it is an object of the present invention to provide a flat, nominally sized component for a behind-the-wall screw anchor that effectively penetrates through the wall to overcome the foregoing and other shortcomings of the prior art.

More particularly, it is an object to provide a wall-penetrating screw anchor forming its own passageway through the wall in the specific shape of a rectangular notch of nominal dimensions, in which an attachment thereto needed for hand manipulation during subsequent alignment of the screw anchor with the screw to be installed is also easily accommodated without enlargement of the passageway dimensions, and having other noteworthy attributes as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIGS. 1 and 2 are side elevational views of a prior art screw support for a sheetrock or similar construction material wall illustrating, in sequence, the installation thereof;

FIG. 3 is a perspective view of the within inventive wall screw support in a contemplated partially penetrated position of movement through the wall;

FIG. 4 is an end elevational view as seen in the direction of lines 4—4 of FIG. 3;

Figure 5:
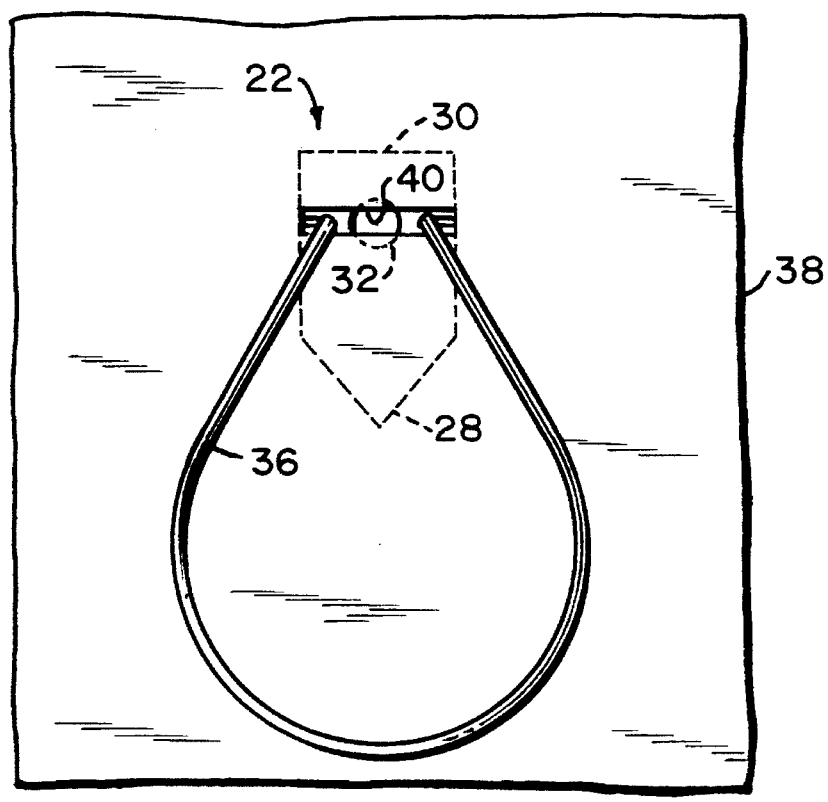
FIG. 5 is also an end elevational view, but illustrating the complete penetration through the wall and positioning of the support for the cooperating screw.

As understood, the constituency of the construction material of a sheetrock wall will not permit, without proper preparation, the threaded engagement thereinto of a screw, self-threading or otherwise, that in use is required to support any significant weight. Thus, use is made of a special bolt, commonly referred to as a "molly bolt", which is caused by the screw cooperating therewith to configurate behind the wall into a pressure anchor so that the head of the screw can apply pressure from opposite directions, i.e. outwardly from the pressure anchor and inwardly from the screw head, against the interposed wall, and thus constitute a proper wall mount for the screw.

A prior art alternative, convenient for reference being documented in U.S. Pat. No. 3,605,547 issued to Millet on Apr. 10, 1969 entitled "Self-Aligning Screw Anchor" uses, as illustrated in FIGS. 1 and 2, a solid bar 10 with a point 12 that is driven through the sheetrock wall 14 during which a lanyard 16 is also squeezed through the wall opening 18 being made. After wall penetration, the lanyard 16 is manipulated to position the bar 10 so that a hole 20 in bar 10 aligns behind the wall opening 18 incident to a threaded bolt (not shown) being projected therethrough to make threaded contact with hole 20.

Figure 6:
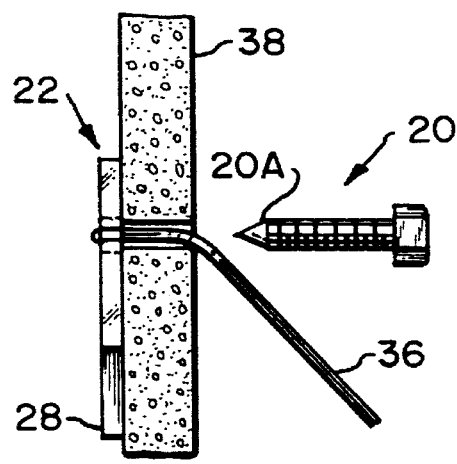
FIGS. 6 and 7 are side elevational views illustrating, in sequence, the assembly of the cooperating screw and support.

To obviate problems in alignment between the weight-supporting screw, designated 20 in FIG. 6, and the within inventive screw anchor or support 22, as well as to facilitate wall penetration of the support 22, instead of a cylindrical bar of the prior art practice of FIGS. 1 and 2, support 22 is a planar body 24 of rectangular shape at its proximal end and, at its distal end, triangular at 26 to present converging edges forming a wall-penetrating point 28. Fabricated of selected thin gauge steel construction material appropriate to penetrate sheetrock, in a preferred embodiment the size of body 24 is 1¾ inches long, ⅞ inches wide, and ¼ inch thick.

In an off-center location, i.e. nearer its rear edge 30, for a reason soon to be better understood, body 24 is provided with a central opening 32 of a diameter sized to threadably receive in threaded engagement the weight-bearing screw 20, and also two edge notches 34 in horizontal alignment with opening 32. A closed loop rubber band 36, as best shown in FIG. 3, is inserted in the notches 34 so that a length portion 36A overlies the screw-receiving opening 32.

In use, and following the sequence of FIGS. 3–7, at the selected site for the wall mounting of screw 20, point 28 is positioned thereat and, using a hammer or the like against rear surface 30, body 24 is driven through the sheetrock wall 38 to ultimately produce a body-shaped notch 40 in wall 38 (see FIG. 5) following the complete wall penetration thereof. It is to be noted from FIG. 4 that the rubber band portion 36A is readily eased through notch 40 by pulling in the directions 42 which causes the rubber construction material of length portion 36A to neck down such that its diminished size easily fits through the height of notch 40.

Once penetrated through wall 38, and as may best be understood from FIG. 5, the screw support 22 assumes the illustrated point-down orientation behind wall 38 because the horizontal alignment of the notches 34 for the rubber band 36 being nearer the top 30 makes the point 28 bottom-heavy.

Figure 7:
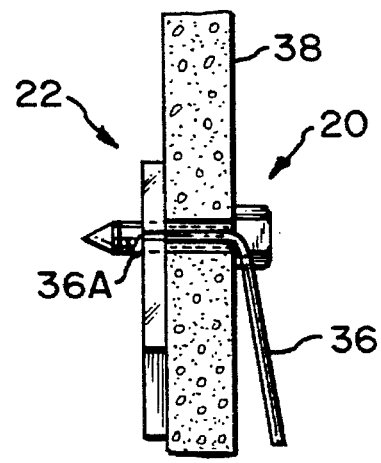

The loop of the rubber band 36 is easily manipulated to position opening 32 behind and visible through notch 30, which position is maintained by the urgency of the rubber band 36, as best illustrated in FIG. 6, thereby permitting the self-threading screw 20 to have its pointed end 20A initiate in the created wall notch 40 the threaded penetration through wall 38 and threaded engagement to the screw support hole 32, pushing aside the length portion 36A (FIG. 7). Once there is screw engagement with the support 22, the rubber band 36 is trimmed off, and complete threaded engagement of the screw 20 with the support 22 provides the pressure grip on the interpositioned sheetrock wall 38 to effectively serve as a support for a wall mounting of the screw.

While the screw support for a wall mount herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A screw support for a wall mount of a type in which a screw is threadably disposed through a support wall for engagement to an operative member strategically positioned behind said wall, said operative member supporting said screw comprising a planar body of a selected wall-penetrating thin gauge metal material having proximal and distal edges, said proximal edge being formed as a rectangular surface for the application thereagainst of an impacting force and said distal edge being pointed to penetrate through said wall causing an entry slot, opposite side edges extending between said proximal and distal edges and each of said side edges having a notch therein, a central screw-receiving hole in said planar body located between said notches, and a closed loop rubber band attached to said body at said notches so as to position in extending relation across said central screw-receiving hole a length portion of said rubber band which is adapted to be stretched into a nominal size to facilitate passage through said slot and having another portion accessible in front of said wall, whereby said planar body is positioned using the accessible rubber band portion so as to align said slot with said central screw-receiving hole for receiving said screw threaded through said slot.

2. A screw support as claimed in claim 1 wherein said notches and central hole are off-center nearer said proximal edge, whereby said distal edge is heavier than proximal edge so that said plate traverses about said rubber band to correspondingly maintain said rubber band in encircled relation about said planar body.

\* \* \* \* \*